US008826018B2

(12) United States Patent
Buch et al.

(10) Patent No.: US 8,826,018 B2
(45) Date of Patent: *Sep. 2, 2014

(54) STATELESS HUMAN DETECTION FOR REAL-TIME MESSAGING SYSTEMS

(75) Inventors: Jeremy T. Buch, Redmond, WA (US); Vlad Eminovici, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/589,885

(22) Filed: Aug. 20, 2012

(65) Prior Publication Data
US 2012/0324224 A1   Dec. 20, 2012

Related U.S. Application Data

(63) Continuation of application No. 11/275,854, filed on Jan. 31, 2006, now Pat. No. 8,261,071.

(51) Int. Cl.
*G06F 21/30* (2013.01)
*G06F 21/31* (2013.01)

(52) U.S. Cl.
CPC ............ *G06F 21/30* (2013.01); *G06F 21/31* (2013.01)
USPC ...................................................... 713/168

(58) Field of Classification Search
CPC ................................ G06F 21/30; G06F 21/31
USPC ........................................................ 713/168
See application file for complete search history.

(56) References Cited

U.S. PATENT DOCUMENTS

| 5,636,280 | A  | * | 6/1997 | Kelly ............................. 713/155 |
| 6,377,691 | B1 | * | 4/2002 | Swift et al. .................... 380/277 |
| 6,546,416 | B1 |   | 4/2003 | Kirsch |
| 7,072,865 | B2 |   | 7/2006 | Akiyama |
| 7,100,054 | B2 | * | 8/2006 | Wenisch et al. ............... 713/185 |
| 7,373,509 | B2 | * | 5/2008 | Aissi et al. .................... 713/168 |
| 2003/0093480 | A1 |   | 5/2003 | Lagarde |
| 2004/0139152 | A1 |   | 7/2004 | Kaler |
| 2007/0033102 | A1 | * | 2/2007 | Frank et al. ..................... 705/14 |

OTHER PUBLICATIONS

Liu, Z., Lin, W., Li, N., & Lee, D. (Nov. 2005). Detecting and filtering instant messaging spam-a global and personalized approach. In Secure Network Protocols, 2005.(NPSec). 1st IEEE ICNP Workshop on (pp. 19-24). IEEE.*

(Continued)

*Primary Examiner* — William Powers
(74) *Attorney, Agent, or Firm* — Andrew Smith; Jim Ross; Micky Minhas

(57) ABSTRACT

Stateless human detection for real-time systems allows a real-time message system to challenge incoming messages suspected of being generated by an automated application. When a suspect message is detected, a challenge is presented to a sender of the message. The challenge is designed to require human intervention to provide a correct answer to the challenge. A challenge packet is sent with the challenge and includes a challenge answer and, possibly, a server identifier, a challenge identifier and/or a time stamp that can be used to prevent attacks on the challenge. The challenge packet is encrypted so that the sender cannot access the contents thereof. When the sender provides a response to the challenge, the sender returns the challenge packet. The challenge packet is decrypted and the challenge answer is compared to a sender answer. If the answers match, the sender is allowed subsequent access to the messaging system.

14 Claims, 5 Drawing Sheets

(56) References Cited

OTHER PUBLICATIONS

Menezes, Alfred J., Paul C. Van Oorschot, and Scott A. Vanstone, "Handbook of Applied Cryptography", CRC Press, 1996. Print.
Martz, David. "Spam filtering techniques", Developer Works, Sep. 1, 2002. <http://www.ibm.com/developerworks/linux/library/lispamf.html>.
Graham, Paul. "A Plan for Spam." Paul Graham. Aug. 2002. <http://www.paulgraham.com/spam.html>.
Wagner, "How Spammers Will Beat Challenge-Response Systems, And Other Conversations About Spam (Wagner's Weblog)", Information Week Jun. 13, 2003.
"CAPTCHA", Computer Desktop Encyclopedia, Carnegie Mellon School of Computer Science, 2003.
Giang, "Linked List", Programming and Data Structures, Aug. 4, 2002. <http://isg.cs.tcd.ie/giangtlLinked_lists.pdf>.
Aura, Tuomas, and Nikander. "Stateless Connections (Stateless)", Lecture Notes in Computer Science 1334/1997(1997): 87-97. Print.
Ulanoff, "Will Challenge/Response Save Us from Spam?" Jul. 28, 2003.

\* cited by examiner

CAPTCHA

STATELESS HUMAN DETECTION FOR REAL-TIME MESSAGING SYSTEMS

CROSS-REFERENCE TO RELATED APPLICATION(S)

This application is a Continuation of and claims benefit from U.S. patent application Ser. No. 11/275,854 that was filed on Jan. 31, 2006, and that is incorporated herein by reference in its entirety.

BACKGROUND

Messaging systems, such as e-mail systems, instant messaging systems, and the like, are susceptible to unwanted attacks in the form of spam, phishing, viruses, etc. Most of these attacks are carried out by automated systems that programmatically generate thousands of messages to legitimate systems, bombarding them with advertisements, messages containing viruses or deceptive information gathering messages, etc.

Non-real-time systems (e.g. e-mail systems) have sufficient time to adequately filter messages and can detect and delete most undesirable messages. But the problem becomes even more pronounced in real-time systems, such as an instant messaging system, because the real-time nature of the system prevents implementation of rigorous authorization logic.

One method that has been used to prevent automated attacks in non-real-time systems is to provide a challenge to a sender of a message that requires human intervention to answer. In some instances, the challenge is a graphic that includes a word jumbled to a point where automated character recognition cannot recognize the word, but a human can. A human can provide an appropriate response to the challenge for authorization where a machine cannot.

However, providing a challenge to suspect users in a real-time system that typically processes thousands of messages per second requires a prohibitive amount of overhead and processing in-band challenges can adversely affect the real-time performance required in such systems.

SUMMARY

The present description relates to stateless human detection for real-time systems. Implementations are described that allow a real-time system to provide challenges that ensure a human user has originated a message sent to the system. Once a challenge is sent to a sender, no state related to the challenge is maintained by the system, thereby overcoming the real-time overhead issues (i.e., memory and processing time) that have previously prevented implementation of such a challenge scheme in a real-time system.

When a real-time messaging system determines to issue a challenge to a sender of an incoming message, the system creates a challenge packet that includes the challenge and an encrypted portion that can only be decrypted by the system that originates the challenge. The encrypted portion includes at least an answer to the challenge and may also include other data.

The sender of the original message responds to the challenge and the challenge packet is returned to the system with the sender response. When the real-time system receives the response to the challenge, the encrypted portion of the challenge packet is decrypted. Measures may be taken to ensure that the challenge is a challenge that originated from the system and that the original challenge has not been tampered with. If the challenge is a valid challenge, the sender response is compared to the challenge answer to determine if the challenge was successfully answered. If so, the sender is allowed to access the system.

In the following description, it will be seen that no state is saved once a challenge has issued. The information required to identify the challenge and determine if the challenge was answered correctly is included in the challenge packet that is exchanged between the real-time system and the sender. Therefore, the information required to process the challenge response is received from the sender in the response to a challenge.

DESCRIPTION OF THE DRAWINGS

The present description references the following figures.

DETAILED DESCRIPTION

The following description relates generally to real-time messaging systems. For discussion purposes, the following description relates specifically to an instant messaging system that is used to dynamically authorize and bridge federated networks. However, it is noted that one or more techniques described herein may be applied to one or more other types of real-time and or non-real-time systems.

Exemplary Challenge

In the following description, challenges are presented that are designed to require a human interaction to provide an answer to a challenge. A particular example utilized herein is a challenge known as a CAPTCHA, or Completely Automated Public Turing test to tell Computers and Humans Apart. A CAPTCHA is well known in the art and comprises a graphic that has a meaning decipherable only to a human being. The graphic is typically a word or series of alphanumeric characters that are skewed in alignment, dispersed among arbitrary markings, displayed over a distracting background, etc. so that optical character recognition techniques cannot determine what the characters are.

Figure 1:
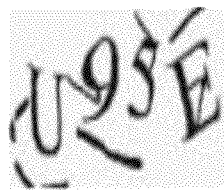
FIG. 1 is an exemplary prior art CAPTCHA (Completely Automated Public Turing test to tell Computers and Humans Apart) challenge.

FIG. 1 depicts a prior art example of a CAPTCHA. In the example shown in FIG. 1, the CAPTCHA includes a string of alphanumeric characters consisting of the following characters: U95E. However, automated character recognition techniques would not be able to determine this particular string from the exemplary CAPTCHA because of the distortion of the image and the characters.

Other challenges may be utilized with the techniques described herein without departing from the scope of the present description and the claims appended hereto. As long as a challenge can be relied upon to require human interaction to provide a correct answer to the challenge, the challenge can be used as described herein.

Exemplary Generalized Data Flow

Figure 2:
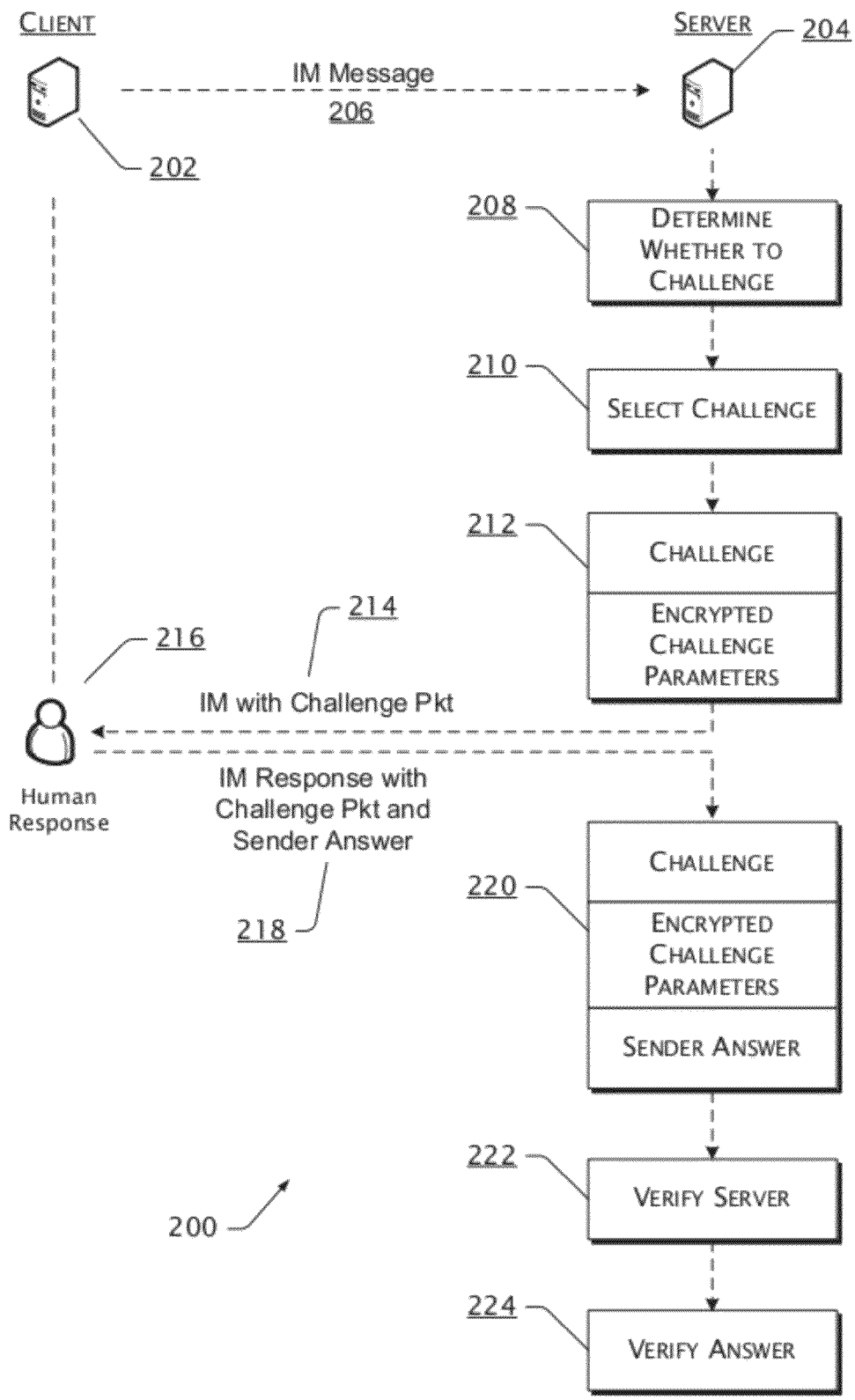
FIG. 2 is a diagram that shows an exemplary generalized data flow for the stateless human detection techniques described herein.

FIG. 2 is a diagram 200 that shows an exemplary generalized data flow for the stateless human detection techniques described herein. The diagram 200 is meant to provide an overview of the data transactions that generally occur in the stateless human detection techniques described herein. Further details of the stateless human detection techniques will be provided below, with respect to subsequent figures.

The techniques described herein contemplate a client 202 that attempts to access an instant messaging system server 204 by sending an IM (Instant Message) message 206 to the server 204. In the present example, the instant messaging system is a real-time messaging system that may be used to dynamically authorize and bridge federated networks. The client 202 may be a client within a same network as the server 204 or it may be a remote client 202 that is unknown to the server 204. Generally, the client 202 may be any computing device configured to transmit an electronic message to the server 204.

The server 204 is configured to determine whether to issue a challenge in response to the IM Message 206 (block 208). In some instances, it may be desirable for the server 204 to challenge the client 202 to ensure that a message received from the client is not a message generated by an automated application. In other words, in an effort to prevent spam, viruses and the like, the server 204 may be configured to challenge messages that are not generated by a human user.

For example, if a message includes a URL (Universal Resource Locator) the server 204 may be configured to authorize a sender of the message since viruses can be propagated through the use of URLs that leverage a client API (Automated Programming Interface) of the instant messaging system to re-send the URL to all of the user's in a target's address book.

Likewise, the server 204 may be configured to challenge any message received from a previously unknown network, since spam can come in the form of automated systems that attempt to send messages to enterprises that would otherwise not receive messages from that particular source. However, because dynamic means of federation are enable, the sending system may be allowed.

Other message sources may be challenged by the server 204 for other reasons in accordance with the purposes of the systems, articles and methods described and claimed herein.

When the server 204 determines that a challenge should be issued in response to the reception of the message 206, the server 204 selects a challenge to transmit to the client 202 (block 210). In at least one implementation which is discussed herein, a challenge is selected from a stored challenge library. The challenge library is a fixed size data structure that stores at least a plurality of challenges and corresponding answers thereto, in one or more implementations described herein, the challenge library may also include a challenge identifier that is used to identify a particular challenge within the challenge library.

As will be seen as the present discussion progresses, the only data that the server stores to implement the challenge process is the data in the challenge library. No state is saved regarding a particular challenge or a message that caused the challenge to be sent. Therefore, the storage required for the described implementations is a fixed amount that is easier to manage than memory that is dynamically allocated.

A challenge packet that includes the challenge and any challenge parameters that may be transmitted with the challenge is assembled (block 212). The challenge parameters are encrypted by the server so that the client 202 cannot access the challenge parameters. The challenge parameters that may be included in the challenge packet include a challenge answer, a challenge identifier (as referenced above), a server identifier, a time stamp and the like. It is noted that different implementations may include different combinations of these or other challenge parameters. The server identifier uniquely identifies the server 204 so that a returned challenge can be verified as having originated with the server 204. The time stamp may be included to help prevent attacks on the challenge (e.g. replay attacks).

The challenge packet is transmitted to the client 202 (IM with Challenge Packet 214). The only portion of the challenge packet that is accessible at the client 202 is the challenge itself and a user interface that explains why the challenge is being presented and provides instructions for answering the challenge. The user interface may be a part of the client 202 or it may be included in the IM with Challenge Packet 214).

A human response (216) is necessary to provide a sender answer to the challenge. An IM with the challenge packet and the sender answer are provided in a sender response (IM Response with Challenge, Challenge Packet and Sender Answer 218) is transmitted back to the server 204. It is noted that since the server 204 did not retain any state regarding the challenge, the information regarding the challenge that the server requires to validate the challenge is contained in the sender response (218).

The server receives the sender response that includes the original challenge, the still-encrypted challenge parameters and the sender answer to the challenge (block 220). From the sender response, the server can decrypt the encrypted information and compare the challenge answer (now unencrypted) to the sender answer. If the challenge packet includes a server identifier, the source of the challenge can be validated (block 222) to prevent false challenge responses that are manufactured to attack a system. If the server is validated and the challenge answer matches the sender answer (block 224), then it can be reliably determined that the sender is not an automated application but is a human user.

The general steps outlined above are described in greater detail below, with respect to subsequent figures.

Exemplary Client-Server Configuration

Figure 3:
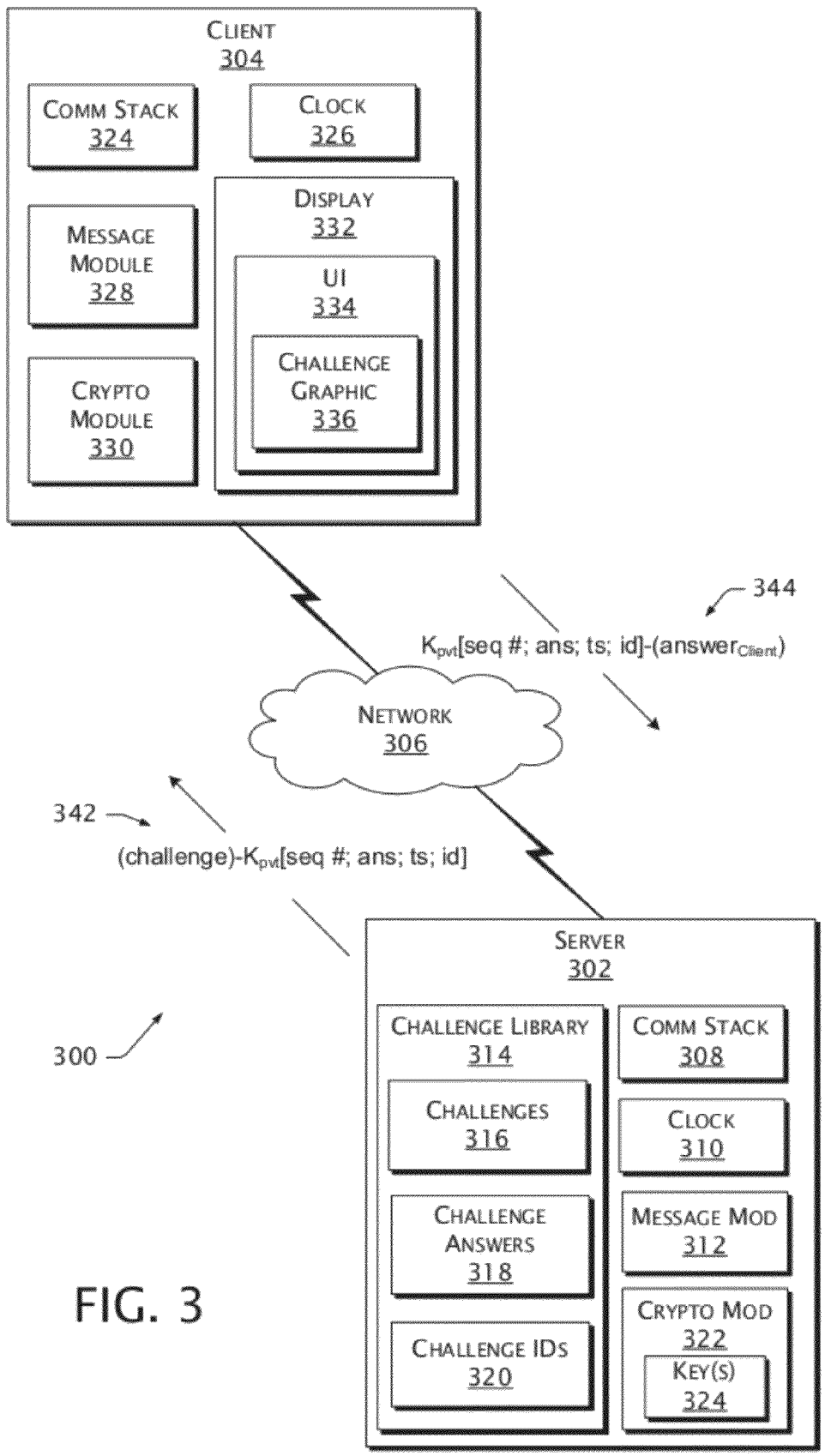
FIG. 3 is a block diagram showing an exemplary client-server configuration that implements a stateless human detection system.

FIG. 3 is a block diagram showing an exemplary client-server configuration 300 that implements a stateless human detection system as described herein. The client-server configuration 300 is a simplified diagram of a server 302 and a client 304 that communicate over a network 306. The exemplary diagram is not intended to show every element in a client-server configuration that is necessary to provide an operational system. Rather, the client server configuration 300 shows particular elements that are relevant to the present discussion. Those skilled in the art will realize other elements that may be included in the configuration or other arrangements of the configuration that may function similarly to the implementations described herein.

It is noted that although the client-server configuration 300 is shown with certain functionality attributed to particular elements, functions described herein may be allocated differently among the same or different elements than are actually depicted. The generalized configuration shown in FIG. 3 is meant only to describe a particular implementation of the systems and methods shown and described herein.

The server 302 includes a communications stack 308, such as a SIP (Session Initiation Protocol) stack, a system clock 310 and a messaging module 312. The messaging module 312 is configured to send messages to and receive messages from one or more other computing devices within an enterprise network in which the server 302 is situation or remote from the enterprise network.

The server 302 also includes challenge library 314 that stores a plurality of challenges 316 and corresponding challenge answers 318. The challenge library 314 is a data structure that has a fixed size. The exact size of the challenge library 314 is an implementation detail that depends on a design of the system and how many unique challenges 316 are deemed necessary, given the traffic expected in the system, the ration of suspect messages to trusted messages, etc.

In at least one implementation in accordance with the present description, the challenge module 314 also includes a sequence table 320 that serves as a challenge identifier to track which challenges 316 have been issued. Although described as a sequence table 320, this module can be configured in any of several ways. In one implementation, the sequence table 320 is a binary number that has a number of bits equal to a number of challenges 316 included in the challenge library.

When a challenge is issued, a sequence identifier corresponding to the set bit is included in a challenge packet that is sent to the sender of the original message. For example, if the sequence table 320 is a 128-bit binary number, a 128-bit number may be used as a sequence identifier where only one of the bits is a "1" and the other bits are "0". The location of the "1" corresponds to a particular challenge in the challenge library and thus identifies the challenge.

When a response to a challenge is received, a bit in the sequence table that corresponds to a sequence identifier included in the challenge response is set. For example, if a sequence identifier is a 128-bit binary number that begins with "1000 . . . " then a high-order bit in the sequence table is set (i.e. changed from "0" to "1"). If that bit is already set, then it indicates that this is a second response to the challenge, which could indicate an attack on the system (e.g. repeatedly sending response to a challenge to try to get one correct by chance).

Challenge responses may also be invalidated if they are received too late, i.e. after a certain period of time has elapsed since the challenge was issued. A delayed response could indicate that a hacker or a computer had spent some time trying to illegitimately formulate a response to a challenge. Timing out a delayed response can prevent this from occurring.

A time stamp can be utilized with the sequence table to allow the sequence table to be reset and challenges to be re-used. For example, if the system is configured to time-out challenges after sixty seconds, sequence table processing can be configured to allow a challenge to be re-used after more than sixty seconds have elapsed since the challenge was originally issued. This can be done in one of many ways, such as by resetting a bit set in the sequence table after an expiration time associated with a challenge corresponding to that bit has elapsed.

The server 302 also includes a cryptographic module 322 that is configured to encrypt, and decrypt messages or portion thereof with one or more keys 324—or certificates—associated therewith. For example, when the server 302 issues a challenge to the client 304, the challenge is included in a challenge packet, that also includes other data that is encrypted. In at least one implementation, the other data includes a correct answer to the challenge. Since the purpose of issuing the challenge would be defeated if the client could access the answer, the cryptographic module 322 of the server 302 encrypts the other data in the challenge packet (i.e. the answer) so that the client 304 cannot access the other data.

In one or more other implementations, the entire challenge packet—including the challenge itself—may be encrypted. It is also noted that the cryptographic module 322 may also be used to encrypt other types of messages.

In addition to encryption, the cryptographic module 322 is also configured to decrypt messages or portions of messages. For example, since the stateless nature of the techniques described herein do not provide for saving any state related to a challenge or a challenged message, challenge parameters are included in a challenge packet, that is transmitted to the client 304. When the challenge parameters are returned in a subsequent message, the cryptographic module 322 decrypts the challenge parameters.

The client 304—also referred to herein as a sender—includes a communications stack 326, a clock 328 and a messaging module 330 that, serve basically the same functions as outlined as similar elements in the server 302. The client 304 also includes a cryptographic module 332 that is used to decrypt challenges received from the server 302, in the event that challenges from the server 302 are encrypted.

In at least one implementation according to the present description, the challenge packet sent from the server 302 to the client 304 is encrypted. Such encryption provides an additional layer of security that encrypts the challenge itself as well as the challenge parameters included in the challenge packet. It is noted that the challenge packet is encrypted with a private key that is unavailable to the client 304 and, therefore, this part of the message cannot be decrypted by the client 304. The cryptographic module 330 is configured to decrypt the challenge portion of the challenge packet if the challenge portion is encrypted. If the challenge portion is encrypted, then the server 302 makes a certificate, or key, available to the client 304 that allows the client to decrypt the challenge.

The client 304 also includes a display 334 that is configured to display a user interface 336 and a challenge graphic 338. In at least one implementation, the challenge graphic is a CAPTCHA. The user interface 336 displays text associated with the challenge graphic and explains to a user where the challenge originates, why it is being sent and instructions for processing the challenge. The user interface 336 may be a custom user interface designed specifically to receive such challenges, or the user interface 336 may be a generic user interface 336 that can display text and/or graphics that are sent from the server 302.

The example shown in FIG. 3 depicts exemplary messages that, are sent between the server 302 and the client 304. A first exemplary message 340 sent from the server 302 to the client 304 in response to the server 302 receiving a message from a client, 304 includes a challenge and a set of challenge parameters. The set of challenge parameters is encrypted with a private certificate associated with the server 302. The challenge parameters include a sequence number associated with the challenge, a challenge answer, a time stamp associated with the message and a server identifier.

Although all of the listed challenge parameters are not required in all implementations of the described techniques, one or more of the challenge parameters shown in the example are used to prevent unauthorized attacks on the challenge. For example, the sequence number may be used to verify a particular challenge when it is returned. Furthermore, the time stamp may be used to verify that the challenge is answered within a predefined time period that is short enough to prevent a user from taking the challenge and figuring out a way to circumvent the challenge. Also, the server identifier may be used to verify that a challenge did indeed originate from the server 302.

A second exemplary message 342 is sent from the client 304 to the server 302 in response to the first exemplary message 340. The second exemplary message 342 includes the still-encrypted challenge parameters and a sender answer (i.e. a client user's response to the challenge). In at least one alternative implementation, the challenge is also returned to the server 302 in this message.

The second exemplary message 342 contains the information required for the server 302 to verify the challenge answer and approve or deny authorization for the client 304 to access the server system. Unlike present systems, which would require the server 302 to maintain state related to issued challenges, the described system allows the server 302 to proceed without storing any state related to the challenge and/or the messages 340, 342. The server 302 can utilize the challenge parameters included with a message returned from the client 304 to verify: (1) that the challenge was answered correctly; (2) that the challenge originated with the server 302 and was not created by a hacker; (3) that the message 342 is a timely response to a server 302 challenge; and (4) that the challenge is not an old challenged being used in a replay attack on the server 302.

Further details of the server 302 and client 304, their elements and the functionality associated therewith are described below.

Exemplary Methodological implementation: Stateless Human Detection

Figure 4:
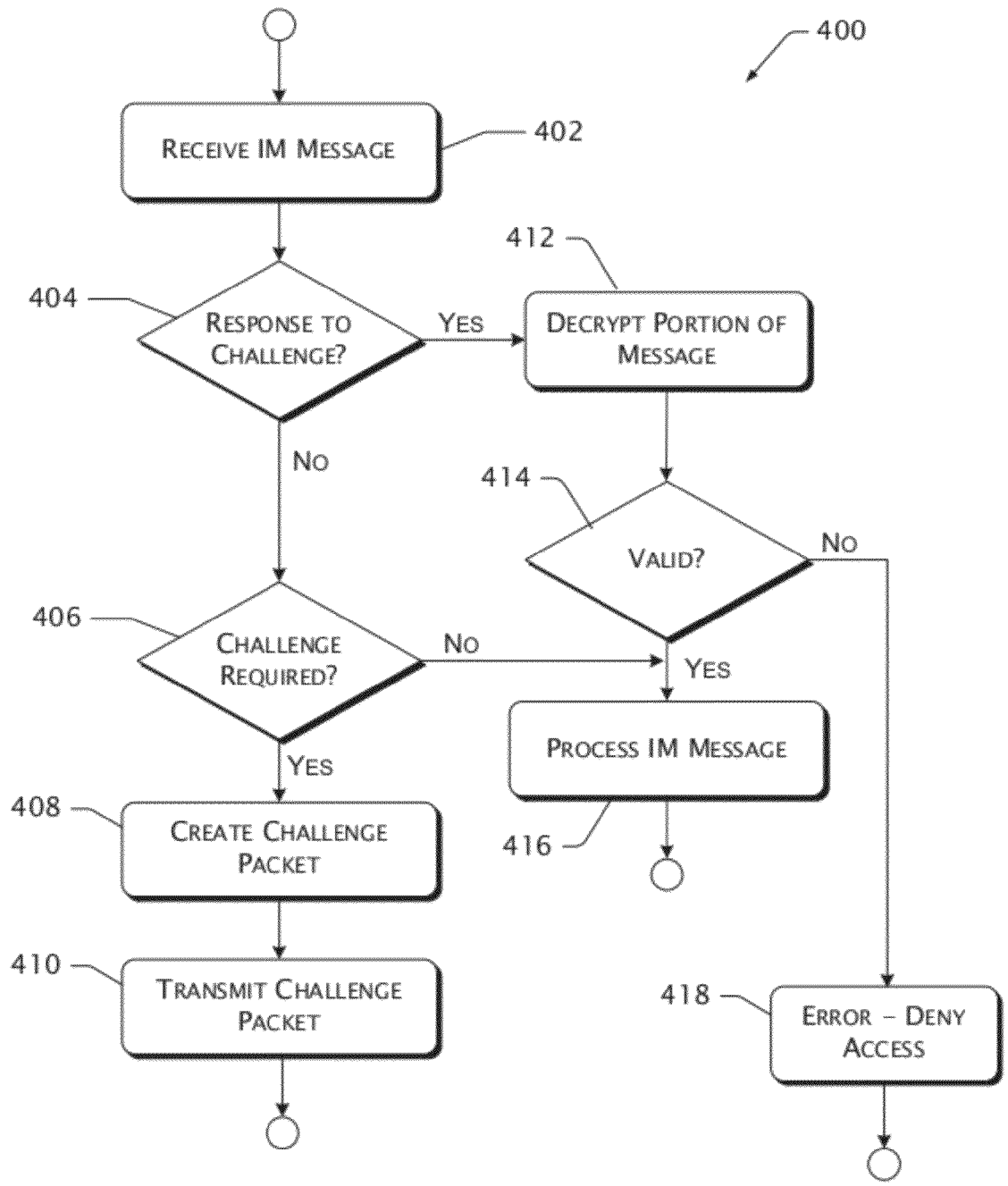
FIG. 4 is a flow diagram that depicts an exemplary methodological implementation of a stateless human detection technique.

FIG. 4 is a flow diagram 400 that depicts an exemplary methodological implementation of stateless human detection. It is noted that the described implementation is exemplary only and that the steps described in relation to the flow diagram 400 may be implemented in a different order than shown, or with more or fewer steps than shown, without departing from the spirit and scope of the claims appended hereto.

In the following discussion, continuing reference is made to the elements and reference numerals shown and described with respect to one or more previous figures.

At block 402, the server 302 receives an instant message (IM) message from the client 304. The message is checked to determine whether the message includes a response to a previous challenge (block 404). In at least one implementation, all incoming messages are checked to determine if they contain a response to a challenge. It is noted that decryption of at least a portion of the message may be required to make this determination. However, some implementations may not require decryption at this point.

If the message does not include a response to a previous challenge ("No" branch, block 404), then the server 302 makes a determination as to whether the message requires a challenge (block 406).

As previously discussed, the server 302 is configured to present a challenge to certain messages. Although not required, the logic for handling this determination is can typically be implemented in the communications stack 308 of the server 302. The server 302 can be configured to send a challenge upon receipt of a message that: is from an unknown source (i.e. a client in a remote network from which the server has not previously received a message): that includes a URL; is randomly selected to be challenge; or that is suspected at any point where prevention of automated messages is desirable or for any reason that the message may be suspected of being automatically generated.

If the server 302 determines that a challenge to the message is not required ("No" branch, block 406), then the message is forwarded to an intended recipient or otherwise processed normally. If the server 302 determines that a challenge is required, the server 302 creates a challenge packet at block 408.

As previously described, the challenge packet (212, FIG. 2) includes at least a challenge 316 selected from the challenge library 314 and a challenge answer 316 associated with the selected challenge 316. The challenge answer 316 is encrypted with a private certificate 324 associated with the server 302 so that the challenge answer 316 cannot be decrypted by any other party.

The challenge packet 212 may also include other challenge parameters, such as one of: a challenge identifier (e.g. a sequence identifier as described above); a time stamp; a server identifier; etc.).

A time stamp may be included and challenge responses may be required to be completed within a certain time period. This can prevent a hacker from having sufficient time to manually figure an answer to a challenge and resubmit the challenge to gain access to the server. The time period must be defined according to the practical properties of the system so that premature time-outs don't cause unwarranted rejections. Sufficient time should be given to allow for message transmission and user interaction without providing enough time for a hacker to manipulate the system.

A server identifier that uniquely identifies the server may be included in the challenge packet. When verifying a challenge response, the server 302 may use the server identifier to verify that the challenge originated with the server. The server identifier, as previously noted, is encrypted and therefore cannot be tampered with. This prevents a hacker from presenting a challenge response that did not originate with the server so that the hacker can present an illegitimate challenge response to gain access to the server 302.

After creating the challenge packet, the server 302 transmits the challenge packet to the client at block 410.

If the incoming message includes a response to a previous challenge ("Yes" branch, block 404), then the cryptographic module 320 of the server 302 decrypts any encrypted portion(s) of the message at block 412 and attempts to validate the challenge and a sender (client) response to the challenge at block 414.

The validation may include from one to several steps. In its simplest form, the validation consists merely of comparing a challenge answer 318 with a sender answer received from the client 302. As previously discussed, a sequence number, a time stamp, a server identifier and/or other validation means may be used to validate the challenge and answer.

If the response is a valid response, i.e. the challenge is valid and originated with the server, the response is returned within a predefined time period, etc. ("Yes" branch, block 414), then the IM message is processed as requested at block 416. If the response includes an invalid challenge or an incorrect answer to the challenge, the IM message is rejected (block 418).

Exemplary Operating Environment

Figure 5:
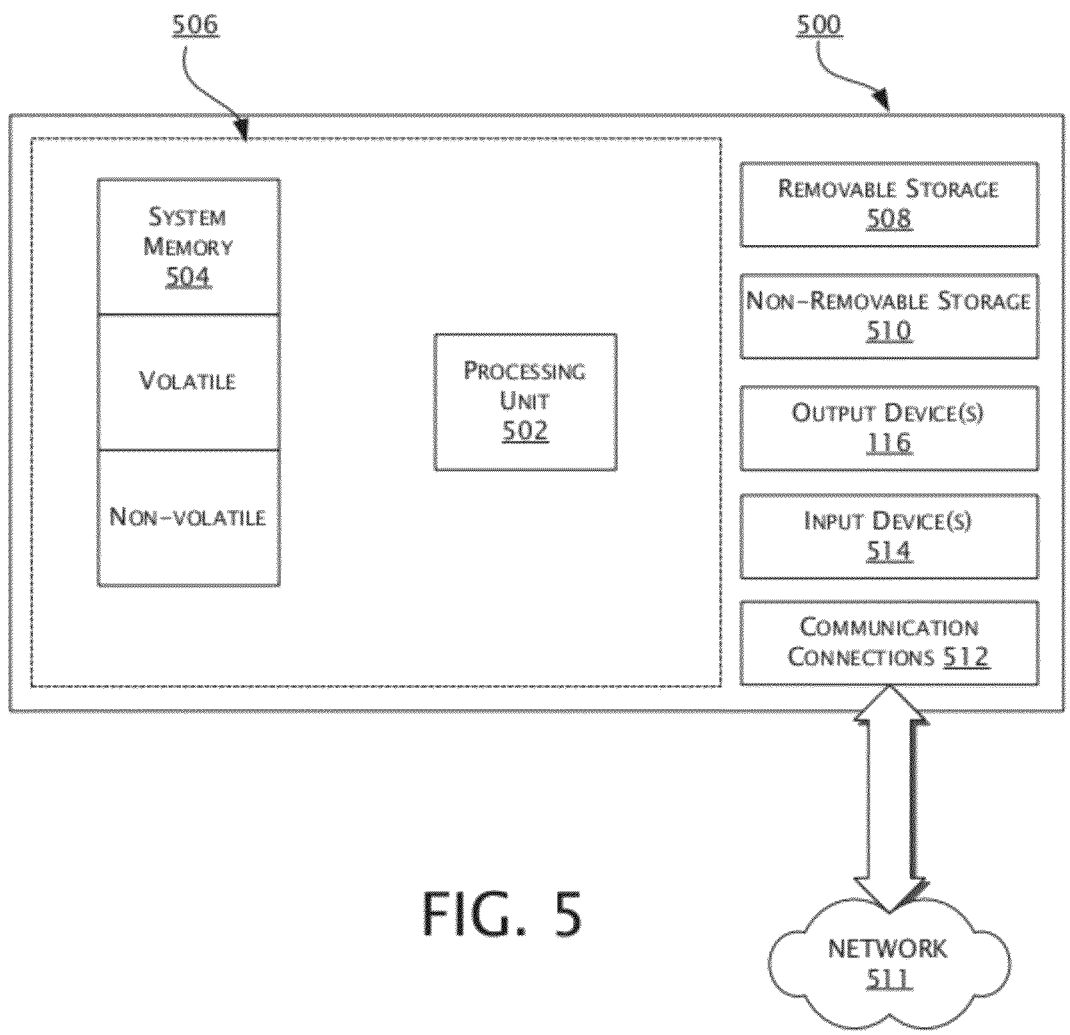
FIG. 5 is a block diagram depicting an exemplary computing environment in which the presently described techniques may be implemented.

FIG. 5 and the following discussion are intended to provide a brief, general description of a suitable computing environment in which all or a portion of a worm containment system may be implemented. The operating environment of FIG. 5 is only one example of a suitable operating environment and is not intended to suggest any limitation as to the scope of use or functionality of the operating environment. Other well known computing systems, environments, and/or configurations that may be suitable for use as a worm containment system described herein include, but are not limited to, personal computers, hand-held or laptop devices, multiprocessor systems, micro-processor based systems, programmable consumer electronics, network personal computers, server computers, mini computers, mainframe computers, distributed computing environments that include any of the above systems or devices, and the like.

Although not required, the worm containment system will be described in the general context of computer-executable instructions, such as program modules, being executed by one or more computers or other devices. Generally, program modules include routines, programs, objects, components, data structures, etc., that perform particular tasks or implement particular abstract data types. Typically, the functionality of the program modules may be combined or distributed as desired in various environments. In a distributed environment, program modules may be located in both local and remote computer-storage media including memory-storage devices.

With reference to FIG. 5, an exemplary system for implementing a worm containment system includes a computing device, such as computing device 500. In its most basic configuration, computing device 500 typically includes at least one processing unit 502 and memory 504. Depending on the exact configuration and type of computing device, memory 504 may be volatile (such as RAM), non-volatile (such as ROM, flash memory, etc.) or some combination of the two. This most basic configuration is illustrated in FIG. 5 by dashed line 506. Additionally, device 500 may also have additional features and/or functionality. For example, device 500 may also include additional storage (e.g., removable and/or non-removable) including, but not limited to, magnetic or optical disks or tape. Such additional storage is illustrated in FIG. 5 by removable storage 508 and non-removable storage 510. Computer storage media includes volatile and non-volatile, removable and non-removable media implemented in any method or technology for storage of information such as computer readable instructions, data structures, program modules, or other data. Memory 504, removable storage 508, and non-removable storage 510 are all examples of computer storage media. Computer storage media includes, but is not limited to, RAM, ROM, EEPROM, flash memory or other memory technology, CD-ROM, digital versatile disks (DVDs) or other optical storage, magnetic cassettes, magnetic tape, magnetic disk storage or other magnetic storage devices, or any other medium which can be used to store the desired information and which can be accessed by device 500. Any such computer storage media may be part of device 500.

Device 500 may also contain communication connection(s) 512 that allow the device 500 to communicate with other computing devices, such as other nodes within a computing system network 511. Communications connection(s) 512 is an example of communication media. Communication media typically embodies computer readable instructions, data structures or program modules. By way of example, and not limitation, communication media includes wired media such as a wired network or direct-wired connection, and wireless media such as acoustic, radio frequency, infrared, and other wireless media.

Device 500 may also have input device(s) 514 such as keyboard, mouse, pen, voice input device, touch input device, laser range finder, infra-red cameras, video input devices, and/or any other input device. Output device(s) 516 such as display, speakers, printer, and/or any other output device may also be included.

In the description that follows, the present invention is described with reference to acts and symbolic representations of operations that are performed by one or more computing devices, unless indicated otherwise. As such, it will be understood that such acts and operations, which are at times referred to as being computer-executed, include the manipulation by the processing unit of the computing device of electrical signals representing data in a structured form. This manipulation transforms the data or maintains them at locations in the memory system of the computing device, which reconfigures or otherwise alters the operation of the device in a manner well understood by those skilled in the art. While the following description is described in the foregoing context, it is not meant to be limiting as those of skill in the art will appreciate that various of the acts and operations described hereinafter may also be implemented in hardware. For example, by utilizing conventional techniques known to those skilled in the art that all, or a portion of the software instructions may be carried out by a dedicated circuit, such as a DSP, programmable logic array, or the like.

The data structures where data are maintained are physical locations of the memory that have particular properties defined by the format of the data. Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or distributively process by executing some software instructions at the local terminal and some at the remote computer (or computer network).

CONCLUSION

While exemplary implementations and applications of the code module initialization have been illustrated and described, it is to be understood that the invention is not limited to the precise configuration and resources described above. Various modifications, changes, and variations apparent to those skilled in the art may be made in the arrangement, operation, and details of the methods and systems of the present invention disclosed herein without departing from the scope of the invention, as both described above and claimed below.

We claim:

1. A method performed on a computing device, the method comprising:
communicating a message in real-time to a destination;
receiving, by the computing device in real-time from a server in response to the communicated real-time message, a challenge message that comprises an unencrypted portion that includes a challenge and that can be accessed by the computing device, and that further comprises an encrypted portion that includes an identifier of the server and that cannot be accessed by the computing device;
presenting to a human user of the computing device the challenge;
obtaining, by the computing device from the human user, a response to the presented challenge; and
sending, by the computing device to the server, a challenge response comprising the obtained response and the encrypted portion of the received challenge message that includes the identifier of the server.

2. The method of claim 1 where the receiving is further based on the computing device being unknown to the destination.

3. The method of claim 1 where the encrypted portion comprises an encrypted second identifier, a decrypted version of which identifies the received challenge message.

4. The method of claim 1 where the encrypted portion comprises an encryption, a decrypted version of which identifies a correct answer to the challenge.

5. The method of claim 4 where the response matches the correct answer.

6. At least one computer storage device storing computer-executable instruction that, when executed by a computing device, cause the computing device to perform a method comprising:
- communicating a message in real-time to a destination;
- receiving, by the computing device in real-time from a server in response to the communicated real-time message, a challenge message that comprises an unencrypted portion that includes a challenge and that can be accessed by the computing device, and that further comprises an encrypted portion that includes an identifier of the server and that cannot be accessed by the computing device;
- presenting to a human user of the computing device the challenge;
- obtaining, from the human user, a response to the presented challenge; and
- sending, by the computing device to the server, a challenge response comprising the obtained response and the encrypted portion of the received challenge message that includes the identifier of the server.

7. The at least one computer storage device of claim 6 where the receiving is further based on the computing device being unknown to the destination.

8. The at least one computer storage device of claim 7 where the encrypted portion comprises an encrypted second identifier, a decrypted version of which identifies the received challenge message.

9. The at least one computer storage device of claim 8 where the encrypted portion comprises an encryption, a decrypted version of which identifies a correct answer to the challenge.

10. The at least one computer storage device of claim 9 where the response matches the correct answer.

11. A system comprising a computing device and at least one program module that are together configured for performing actions comprising:
- communicating a message in real-time to a destination;
- receiving, by the computing device in real-time from the destination in response to the communicated real-time message, a challenge message that comprises an unencrypted portion that includes a challenge and that can be accessed by the computing device, and that further comprises an encrypted portion that includes an identifier of the server and that cannot be accessed by the computing device;
- presenting to a human user of the computing device the challenge;
- obtaining, from the human user, a response to the presented challenge; and
- sending, to the server, a challenge response comprising the obtained response and the encrypted portion of the received challenge message that includes the identifier of the server.

12. The system of claim 11 where the computing device cannot access unencrypted data of the encrypted portion of the received challenge message.

13. The system of claim 12 where the encrypted portion comprises an encryption, a decrypted version of which identifies a correct answer to the challenge.

14. The system of claim 13 where the response matches the correct answer.

* * * * *